US005486423A

United States Patent [19]

Lewiner et al.

[11] Patent Number: 5,486,423

[45] Date of Patent: Jan. 23, 1996

[54] $SIO_2$ ELECTRETS AND PROCESS OF MAKING IT

[76] Inventors: Jacques Lewiner, 7 avenue de Suresnes, 92210 Saint-Cloud; Didier Perino, 84 rue Voltaire, 92500 Rueil-Malmaison, both of France

[21] Appl. No.: 182,707

[22] Filed: Jan. 13, 1994

[30] Foreign Application Priority Data

Jan. 14, 1993 [FR] France .................................. 93 00297

[51] Int. Cl.[6] .............................. B32B 15/04; H05H 1/24

[52] U.S. Cl. .......................... 428/450; 427/579; 427/578; 427/397.7; 427/573; 427/574

[58] Field of Search .................................... 427/573, 574, 427/578, 579, 397.7; 428/450

[56] References Cited

FOREIGN PATENT DOCUMENTS 0428839 5/1991 European Pat. Off. .

OTHER PUBLICATIONS

Gunther et al, "Annealing Effects in TSD–spectra of SiO2 Electrets", 7th International Symposium on Electrets, 25 Sep. 1991, pp. 663–668.

*Primary Examiner*—Roy V. King
*Attorney, Agent, or Firm*—Larson & Taylor

[57] ABSTRACT

For making an $SiO_2$ electret, a layer of $SiO_2$ is formed on a solid substrate (5) by chemical vapor deposition in a vapor phase starting from a plasma containing silicon and oxygen and the layer so formed (10) is subjected to a thermal treatment by raising its temperature to above 100° C. during a time period longer than 1 hour, before being electrically charged.

8 Claims, 1 Drawing Sheet

1
3
4
6
10
7
5
9
8
2

11
10
5

12
10
5

V
14
13
V0
16
15
5
10

20
5
10
e
17
e'
21
22
19
18

$SiO_2$ ELECTRETS AND PROCESS OF MAKING IT

Electrets, which are dielectrics carrying a permanent electrical polarization, are used in many devices, such as microphones or electrostatic relays.

The invention concerns, among these electrets, those which are made of a foil or a thin layer of silicon dioxide $SiO_2$, electrically charged.

Such electrets in $SiO_2$ present a certain number of advantages as compared to those made of polymer materials, particularly the following:

- they have a better behaviour at elevated temperatures,
- they can be made in smaller thickness, that is to say smaller than 10 microns,
- they can be more easily set on a substrate, since they can be formed chemically directly on such substrates, either by direct superficial oxidation of a silicon substrate or by direct deposition in vapor phase, using an adequate plasma containing silicon and oxygen, on a solid substrate which can be constituted by silicon or any other material besides silicon.

But with presently known modes of realization of these $SiO_2$ electrets, the life expectancy is shorter than that of polymer electrets, such life expectancy being generally limited to a few months.

In order to increase this life expectancy, it has been proposed to chemically treat $SiO_2$, with hexamethyldisilazane (HMDS) before charging it electrically, but this process is difficult to operate and the results obtained are not satisfactory.

In the case when the $SiO_2$ layer to be transformed into an electret has been obtained by direct superficial oxidation of a silicon substrate, it has also been proposed to study the influence, on the life expectancy of the future electret, of a heating of said SiO2 layer, before charging it electrically (article by Günter et al., published pages 663–668 of the proceedings of the 7th international symposium on electrets, "ISE 7", Berlin, Sep. 1991).

These studies have shown that a preheating does not increase significantly the life expectancy : on the contrary, for some of these electrets, the influence of said preheating on the stability of the charge of the electret is a "considerable reduction" of such stability.

The invention makes it possible to reach the above described goal, that is to say a considerable increase in the life expectancy of SiO2 electrets.

For this purpose the processes to make an electret in SiO2 according to the invention still include a first step which consists of forming a $SiO_2$ layer on a solid substrate by direct deposition in vapor phase starting from a plasma containing silicon and oxygen and they are essentially characterized in that the layer so formed is subjected to a thermal treatment by raising its 20 temperature to above 100° C. during a time period longer than 1 hour, before electrically charging it.

In preferred embodiments recourse is further had to one and/or the other of the following arrangements:

- the above mentioned plasma contains hydrogen,
- the $SiO_2$ layer is formed from a plasma constituted by a mixture of two components in vapor phases which are respectively Silane ($SiH_4$) and Nitrogen protoxide ($N_2O$) and the chemical reaction between these two components is carried out in a vessel in which there is a high frequency electric field and a pressure between 0.1 and 1.5 millibars, in the presence of a heated substrate, preferably at a temperature of the order of 300° C.,
- the thermal treatment of the $SiO_2$ layer, formed according to the preceeding alinea is carried out by heating the layer at a temperature of the order of 150° C. during a time period superior to 24 hours, typically of the order of 48 hours,
- the electrically charging of the $SiO_2$ layer, after its thermal treatment is done using the corona effect produced by a conducting wire raised at a high voltage, notably through a grid itself raised at a potential of the order of that expected for the electret under fabrication,
- the electrically charging of the $SiO_2$ layer, after its thermal treatment, is done using an electron gun,
- the $SiO_2$ layer forming the electret is deposited on a metallic substrate constituting one electrode of a device which includes another electrode, separated from said layer by an air gap, the thickness of said electret being in the range 0.5–3 microns.

Apart from these arrangements, the invention comprises certain other arrangements which are preferably used am the same time and which will be more explicitly discussed hereafter.

In what follows some preferred embodiments of the invention will be described with reference to the accompanying drawings in a way which is of course in no wise limitative.

Figure 1:
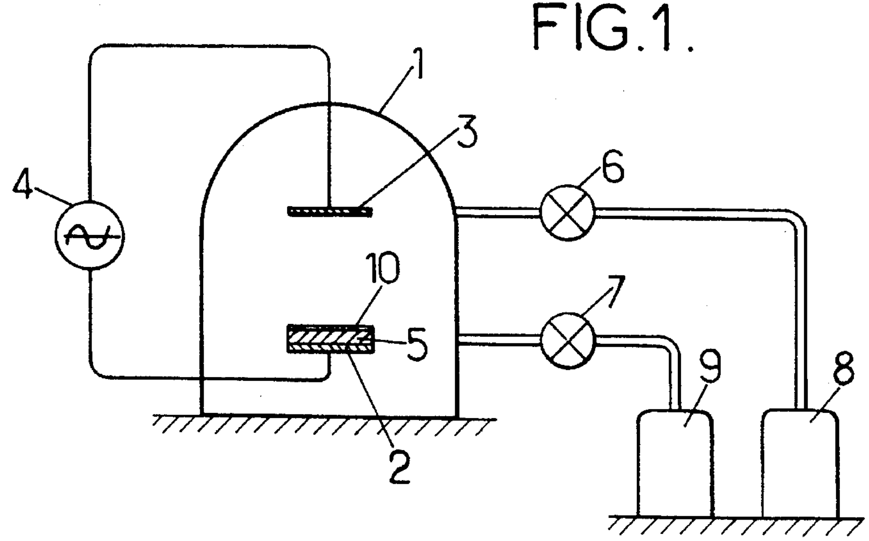
FIG. 1 of these drawings shows very schematically the first step of a process to manufacture electrets according to the invention.
Figure 2:
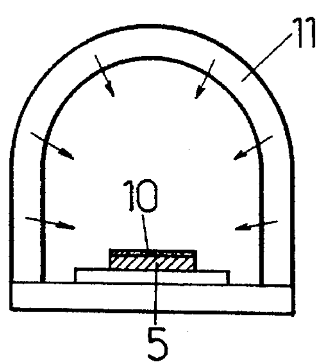
FIG. 2 shows schematically the second step of such process.

The first step of the process to manufacture electrets involves a vessel 1 inside which are placed two electrodes 2 and 3 made of horizontal conductive plates placed one above the other one.

These two plates 2 and 3, which form the armatures of a condenser, are connected to a source 4 of high frequency electric energy.

A substrate 5 is placed on the lower plate 2 and can be advantageously constituted by a metallic foil, for instance in copper or steel.

The vessel 1 is connected, by respectively two valves 6 and 7, to two containers 8 and 9 of gazeous components A and B containing respectively silicon and oxygen.

The chemical reaction between these two components is carried out in vessel 1 by introducing into it well determined volumes of each of these two components through valves 6 and 7 and by activating source 4.

This reaction which is commonly designated under the name "CVD"(Chemical Vapor Deposition), produces a deposition of $SiO_2$ 10 on substrate 5.

In an embodiment having given satisfaction:

- the components A and B were respectively Silane ($SiH_4$) and Nitrogen protoxide ($N_2O$),
- the frequency F was equal to 13.56 MHz,
- the pressure in vessel 1 was between 0.1 and 1.5 millibars, and the substrate 5 was heated at a temperature of the order of 300° C., notably by an electric heating of plate 2.

The chemical component, other than $SiO_2$, resulting from the chemical reaction was in this example $N_2H_2$ which was evacuated.

The thickness of deposit 10 is controlable as function of time: the rate of deposition was of the order of 5000 to 10000 Å/mn in the above mentioned example.

The process is stopped by suppressing the excitation of source 4 when said thickness has reached a value between 0.5 and 3 microns.

If the deposited layer 10 is electrically charged at this stage, experience shows that the life expectancy of the resulting electret is small.

In order to increase this life expectancy, according to the invention, layer 10 and its substrate 5 are submitted to a thermal treatment which consists of a heating process.

This heating process is carried out at a temperature larger than 100° C. during a duration larger than 1 hour.

In a preferred mode of embodiment said heating is made in oven 11 at a temperature of the order of 150° C. during a duration of the order of 48 hours.

It is only after this thermal treatment and the subsequent eventual cooling of substrate 5 and layer 10 that this layer is electrically charged.

For this purpose it is possible to use any known charging technique.

Figure 3:
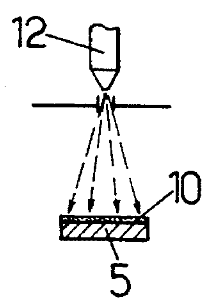
FIG. 3 and 4 show schematically two variants of the third step of said process.
Figure 4:
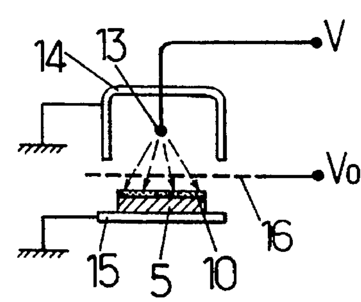

As an example it is possible to use an electron gun 12 (FIG. 3) under vacuum.

In an other example the electrical charging of the electret is carried out by using the discharge with corona effect produced near a conductive wire 13 (FIG. 14) raised at an elevated potential V and placed inside a tunnel 14 itself connected to ground : substrate 5 and layer 10 are placed facing said wire, on a supporting conducting member 15 itself connected to ground.

Moreover a thin grid 16 raised at a potential $V_o$, equivalent to the expected potential of the electret under preparation is placed between wire 13 and layer 10.

As an example potentials V and $V_o$ are respectively equal to —7 000 volts and —200 volts.

The experiment shows that the electrets in $SiO_2$ resulting from the electrical charging of layer 10 itself made and thermally treated as here above described exhibit a remarkably long life expectancy, apparently of the order of decades, which constitutes a very surprising result.

A possible interpretation of this surprising result is the following : since it has been formed by chemical combination of two distinct components, the $SiO_2$ deposited layer contains, at very low concentration atoms of substances other than silicon and oxygen, substances such as hydrogen and nitrogen, and these atoms, trapped within the deposited layer are blocked during the subsequent heating to a point where they can become trapping centers able to retain the electric charges which will reach them later on.

The applications of $SiO_2$ electrets with long life expectancy obtained as above described are both numerous and important, particularly taking into account their very small thickness.

Figure 5:
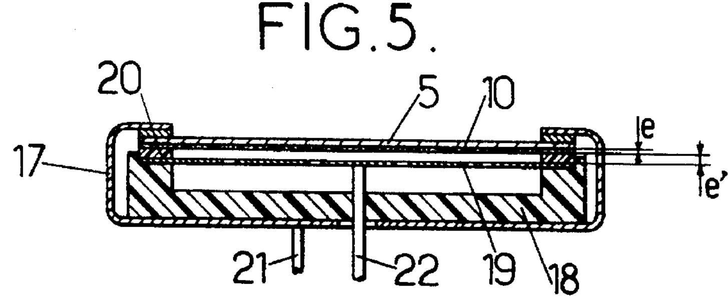
FIG. 5 shows schematically an acoustic device equiped with an electret in $SiO_2$ according to the invention.

One such application has been illustrated on FIG. 5, which shows an acoustic device of the type of microphones or earphones.

Such a device includes : a metal case 17 having a C shaped profile, which contains a piece 18 made of an insulating material having a U shaped profile, piece which is itself closed by a perforated metal plate 19 which acts as a first electrode, this plate 19 supporting itself an insulating washer ring 20, the electret 10 and a thin conducting foil 5 which constitutes the substrate of the electret and which is stretched over the opening of case 17 to which it is electrically connected.

Pins 21 and 22 , in electrical contact with case 17 and foil 19 make it possible to connect the device to an external electronic circuitry.

The very small thickness of the electret 10 is particularly interesting in such an application.

Indeed if e is the thickness of electret 10 and e' the thickness of the air layer between this electret 10 and electrode 19, the sensitivity of the considered acoustic device is proportional to the electrostatic field which exists, in the absence of vibration between the two electrodes 10 and 19, field which is inversely proportional to the thickness of the condenser delimited by these electrodes, that is to say to e and e'.

In an other embodiment of the above device the electret is placed against electrode 19 on the side facing electrode 5 : in this case plate 19 may be a silicon substrate and the perforations can be made by any known technique, for instance chemical machining.

Following which and whatever the embodiment adopted, electrets in $SiO_2$ are finally obtained whose constitution and mode of fabrication follow sufficiently from the foregoing.

These electrets have numerous advantages with respect to those known heretofor, in particular those with a long life expectancy, a small thickness, an intimate adhesion to the substrate they are placed on, and a good resistance to heat.

As is evident, and as it follows moreover already from what has gone before, the invention is in no wise limited to those of its embodiments and modes of application which have been more especially considered; it embraces, on the contrary, all variants thereof.

We claim:

1. Process for making an electret which comprises the steps of forming a layer of $SiO_2$ on a solid substrate, by chemical vapor deposition in a vapor phase starting from a plasma containing silicon and oxygen, subjecting the layer so formed to a thermal treatment by raising its temperature to above 100° C. for a time period longer than 1 hour and then electrically charging said thermally treated layer.

2. Process according to claim 1, wherein the plasma contains hydrogen.

3. Process according to claim 2, wherein the $SiO_2$ layer is formed from a plasma constituted by a mixture of silane ($SiH_4$) and nitrous oxide ($N_2O$) and carrying out the chemical reaction between the $SiH_4$ and NO in a vessel in which there is a high frequency electric field and a pressure between 0.1 and 1.5 millibars, and in the presence of a heated substrate.

4. Process according according to claim 3, wherein the thermal treatment of the $SiO_2$ layer, is carried out by heating the layer at a temperature of the order of 150° C. during a time period superior to 24 hours.

5. Process according to claim 1 wherein the electrically charging of the $SiO_2$ layer after its thermal treatment, is done using the corona effect produced by a conducting wire raised at a high voltage, through a grid itself raised at a potential of the order of that for the electret under fabrication.

6. Process according to claim 1 wherein the electrically charging of the $SiO_2$ layer, after its thermal treatment, is done using an electron gun.

7. Electret made according to claim 1 wherein the $SiO_2$ layer forming the electret contains atoms of substances other than silicon and oxygen, which act as traps retaining the electric charges.

8. Electret according to claim 7, wherein said $SiO_2$ layer forming said electret is formed on a metallic substrate constituting one electrode of a device which includes another electrode, separated from said electret by an air gap, the thickness of said electret being in the range 0.5–3 microns.

* * * * *